Nov. 7, 1939.　　　A. O. GOTTSCHALK　　　2,178,962
PLOTTING PROTRACTOR
Filed Feb. 11, 1939
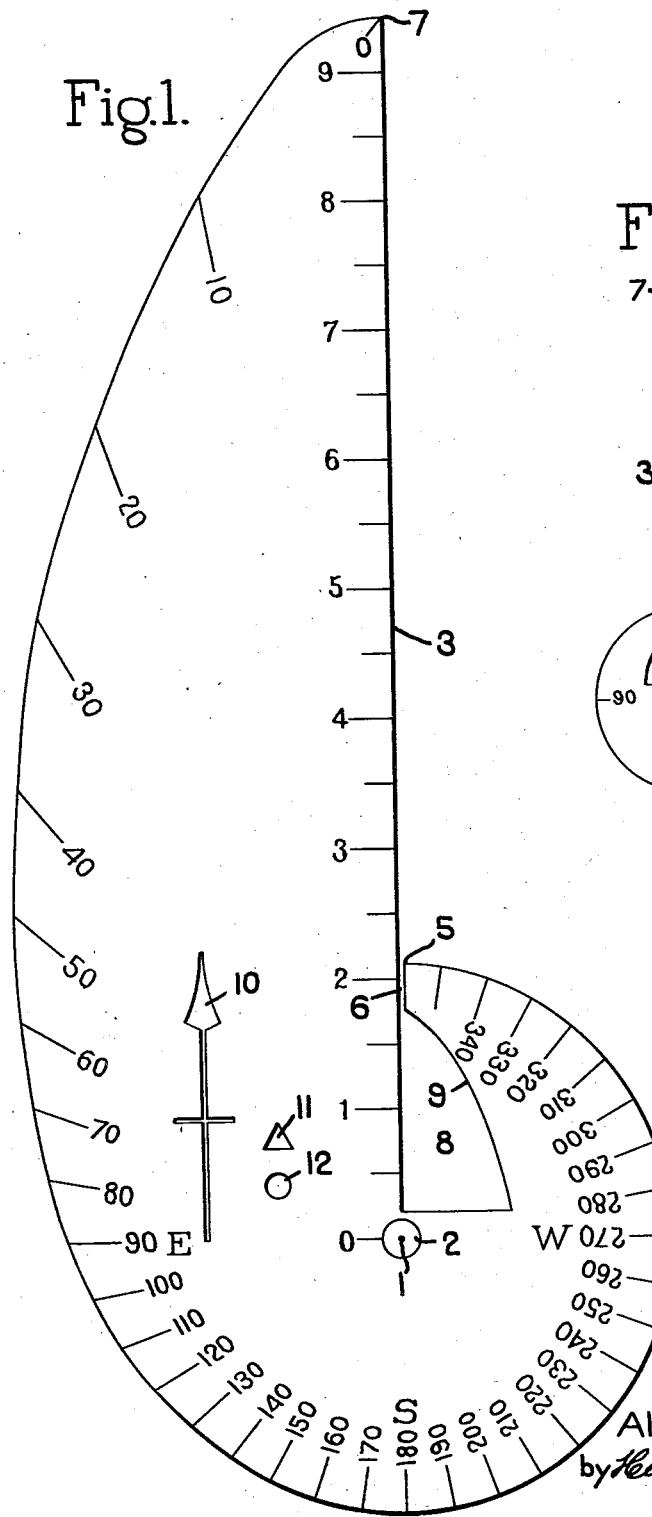
Inventor.
Albert O. Gottschalk
by Heard Smith & Tennant.
Attys.

Patented Nov. 7, 1939

2,178,962

UNITED STATES PATENT OFFICE 2,178,962

PLOTTING PROTRACTOR

Albert O. Gottschalk, Bridgewater, Mass.

Application February 11, 1939, Serial No. 255,793

3 Claims. (Cl. 33—1)

This invention relates to improvements in protractors of the fixed plotting arm type in which the plotting arm is integral with the device.

The object of the invention is to provide a protractor of this type in which the graduated angular scale extends, except for a negligible amount, throughout the entire 360 degrees, and in which the plotting arm presents a straight edge with a graduated linear scale extending from and available for plotting beginning at substantially the center of the device.

The invention further has for its object to provide such a protractor in which the main portion of the curved periphery is of gradually increasing radii enabling the protractor to be used as a French curve or similar device.

The object of the invention is to provide such a protractor by means of which any distance within the limits of the linear scale of the plotting arm beginning at substantially the center of the device may be plotted for any deflection angle or any azimuth angle without removing the device from its position on the working surface.

These and other objects and features of the invention will appear more fully from the accompanying description and drawing and will be particularly pointed out in the claims.

The drawing illustrates a preferred form of protractor embodying the invention, in which:

Fig. 1 is a view of the face provided with scales for plotting azimuth angles.

Fig. 2 is a view on a smaller scale of the opposite face for plotting deflection angles with only a portion of the scale represented.

The protractor may be made of any suitable sheet material such as employed for instruments of this type and of any suitable size. The protractor is provided with a pivotal center 1 which may be of any type to permit the protractor to be rotated on this center when placed upon a working surface. As illustrated, this center is a tiny hole through which a fine needle or pin may be inserted. Preferably it is formed in an insert 2 of some highly transparent substance when, as is desirable, the body of the protractor is relatively opaque, thus providing a quick means of placing the pivotal center over the required point of the working surface or drawing. The straight plotting edge 3 of the protractor extends from the pivotal center 1 and is relatively long. A linear scale is graduated along the plotting edge and may be composed of any required linear units and with any required number of subdivisions. The zero of this scale is located at the pivotal center. This linear scale may be formed directly in the material of the protractor or it may be printed or otherwise formed on a separate strip such as 4 shown on the opposite face of the protractor in Fig. 2. When thus formed on a separate strip, this strip may be removed and replaced to enable the device to be provided with different scales.

The curved periphery of the protractor begins at a point 5 at a negligible distance from the straight edge 3, a slight space or narrow opening 6 being left only of sufficient width to allow the point of a pencil or plotting instrument to pass between the point 5 and the edge 3. From the point 5, which is relatively near the pivotal center, the curved periphery extends through the entire 360 degrees except for the negligible distance 6 to the point 7 on the straight edge 3 and relatively far from the center. The right-hand portion of the periphery, viewing Fig. 1, is conveniently substantially semi-circular but the main portion, or that shown at the left, is of gradually increasing radii. This enables the protractor to be used as a French curve or similar drafting instrument and is a matter of great convenience to the user.

The curved periphery of the protractor is graduated throughout with an angular scale so that the entire range of 360 degrees, except for the negligible or slight arc across the narrow opening or space 6, is available for plotting. The main face of the protractor shown in Fig. 1 is graduated for plotting azimuths. For this purpose the zero point is located at the point 7 and the graduations extend therefrom throughout practically the entire 360 degrees with any required subdivisions. The opposite face shown in Fig. 2 is illustrated as graduated for plotting deflection angles. In this case the zero points may be located one diametrically opposite the straight edge 3 and one at the point 7 at the end of the straight edge. The graduations then will extend in quadrants from both zero points. Only two such graduations are shown at the 90-degree points but it will be understood that these graduations extend with any degree of subdivisions throughout the entire periphery.

A wide opening 8 is formed in and through the protractor bounded on one side by a portion of the straight edge 3 and extending from adjacent the center to adjacent the periphery and terminates in the narrow space 6 already described. The edge 9 of this opening is preferably curved so as to give a large area to the opening while at the same time leaving the portion of the protractor adjacent the straight edge sufficiently strong. This opening 8 enables points plotted at the lower end of the linear scale readily to be marked or annotated on the working surface.

The protractor is also conveniently provided with any desired indicia such as the compass markings E, S and W shown in Fig. 1. Also it may be provided with cut-out portions such as a conventional needle 10, small triangle 11, small circle 12, which are very useful templates for the draftsman.

It will thus be seen that the plotting protractor of this invention is a very convenient device enabling distances to scale on a given azimuth to be rapidly and accurately plotted. The device as illustrated is designed primarily for a map draftsman doing topographic work wherein a number of distances on a number of azimuths or bearings are plotted from a given point on a line of known direction. The protractor also is equally available for plotting deflection angles. In fact, it is available for a wide variety of uses and it will be understood that the direction in which the angular graduations run, the fineness and markings of these graduations, the character of the graduations of the linear scale, may all be varied as desired.

It will be seen that the draftsman with the protractor of this invention can readily plot any distance throughout the entire length of the scale beginning practically at the zero point and plot this distance for any deflection angle or any azimuth angle throughout substantially the entire range of 360 degrees without removing the protractor from the working surface and can also readily make on the working surface annotations with respect to the points plotted.

Having thus described the invention, what is claimed as new, and desired to be secured by Letters Patent, is:

1. A plotting protractor of sheet material having a pivotal center, a straight plotting edge extending from the center and presenting a graduated linear scale beginning at the center, a curved periphery extending from a point relatively near the center to a point at the end of the straight edge and relatively far from the center and presenting throughout on one face of the protractor a graduated angular scale, and a wide opening through the protractor bounded on one side by a portion of the straight edge, extending from adjacent the center to adjacent the periphery, and terminating in a narrow opening sufficient for the passage of a pencil point through the periphery along the straight edge.

2. A plotting protractor as defined in claim 1, in which the portion of the curved periphery extending from a point opposite to the straight edge to a point at the end of the straight edge is of gradually increasing radii.

3. A plotting protractor as defined in claim 1, in which the zero and the 360-degree points of the angular scale are at the straight edge enabling the protractor to be used for plotting azimuths throughout the entire circle except for a slight arc across the said narrow opening.

ALBERT O. GOTTSCHALK.